United States Patent
Magill et al.

(10) Patent No.: US 6,343,066 B2
(45) Date of Patent: Jan. 29, 2002

(54) NON-CONSECUTIVE DATA READOUT SCHEDULER

(75) Inventors: Robert Bradford Magill, Mishawaka; Kent Daniel Benson, Granger; Terry Jon Hrabik, South Bend, all of IN (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

(21) Appl. No.: 09/802,389

(22) Filed: Mar. 9, 2001

Related U.S. Application Data

(60) Provisional application No. 60/188,396, filed on Mar. 10, 2000.

(51) Int. Cl.[7] .............................................. G01R 31/08
(52) U.S. Cl. ...................................... 370/230; 370/412
(58) Field of Search ................................ 370/229, 230, 370/232, 235, 412, 415, 416, 418; 709/232, 235

(56) References Cited

U.S. PATENT DOCUMENTS

| | | | |
|---|---|---|---|
| 5,241,536 A | | 8/1993 | Grimble et al. |
| 5,500,858 A | | 3/1996 | McKeown |
| 5,517,495 A | * | 5/1996 | Lund et al. .................. 370/399 |
| 5,859,856 A | | 1/1999 | Oskouy et al. |
| 5,872,769 A | | 2/1999 | Caldara et al. |
| 5,875,176 A | | 2/1999 | Sherer et al. |
| 5,996,019 A | * | 11/1999 | Hauser et al. ............... 709/235 |
| 6,064,676 A | | 5/2000 | Slattery et al. |
| 6,160,812 A | * | 12/2000 | Bauman et al. ............. 370/416 |

* cited by examiner

Primary Examiner—Min Jung
(74) Attorney, Agent, or Firm—Banner & Witcoff, Ltd.

(57) ABSTRACT

Data switching systems for use in ATM and other packet and cell switching networks can more smoothly switch data if incoming data packets to be switched are re-ordered to avoid overwhelming an output port with too many consecutive packets to a particular destination. An apparatus and method for simply re-ordering data samples in a non-consecutive manner is computationally efficient and effective.

25 Claims, 5 Drawing Sheets

PRIOR ART

100

| 8 | 7 | 6 | 5 | 4 | 3 | 2 | 1 | BYTE OCTET |
|---|---|---|---|---|---|---|---|---|
| GFC (at UNI), VPI (at NNI) | | | | VPI | | | | 1 |
| VPI | | | | VCI | | | | 2 |
| VCI | | | | | | | | 3 |
| VCI | | | | PT | | | CLP | 4 |
| HEC | | | | | | | | 5 |

104 brackets the above header table.

GFC = GENERIC FLOW CONTROL  PT = PAYLOAD TYPE
VPI = VIRTUAL PATH IDENTIFIER  CLP = CELL LOSS PRIORITY
VCI = VIRTUAL CHANNEL IDENTIFIER  HEC = HEADER ERROR CONTROL

| 8 | 7 | 6 | 5 | 4 | 3 | 2 | 1 | 6 |
|---|---|---|---|---|---|---|---|---|
| ⋮ | | | | | | | | |
| 8 | 7 | 6 | 5 | 4 | 3 | 2 | 1 | 53 |

102 brackets the payload table.

FIG. 1

NON-CONSECUTIVE DATA READOUT SCHEDULER

This application claims priority under 35 U.S.C. §119(e) to provisional application Ser. No. 60/188,396, filed Mar. 10, 2000, the entire writing and content of which is incorporated by reference.

FIELD OF THE INVENTION

This invention relates to data networks. In particular, this invention relates to a method and apparatus for smoothing data flow through a switching system used in packetized data networks.

BACKGROUND OF THE INVENTION

Packetized data networks are relatively well known. Such networks include Ethernet networks, Internet Protocol (IP) networks and asynchronous transfer mode (ATM) networks. The data packets carried by these networks typically have some sort of informational header file or header data to which a data payload is attached or appended. The header is formatted to have embedded within it various information that is used to route the associated payload to an appropriate destination. By way of example, FIG. 1 shows an exemplary depiction of an ATM data packet.

An ATM data packet (100) consists of forty-eight (48) informational payload bytes (102) (identified in FIG. 1 as byte octets numbered from 6–53) preceded by a five (5) byte header block (104) to form a fifty-three byte ATM packet (100). The informational payload bytes (102) represent information from some sort of data source, which might include voice information as part of a telephone call, video programming information or raw data exchanged between two computers such as a word processing file for example. The header block (104) includes addressing information that is read by and used by ATM switching systems (not shown) which route the ATM packet (100) through an ATM switching network. Some of the information in the header block 104 enables a switch to determine the next ATM switch to which the packet is to be routed.

FIG. 2 shows exemplary connections to a known prior art ATM switching system 200 as it might be configured in an ATM network. Such a system is typically configured to receive streams of ATM packets from multiple ATM switching systems at the switch input ports 202, 204, 206. When the packets comprising the incoming streams are received, they are routed to a switching fabric 210 from which the packets emerge at one or more ATM packet output ports 212, 214, 216 coupled to different physical transmission paths leading to different ATM switches in the network. Each input port 202, 204, 206 may receive ATM cells that need to pass through any given output port 212, 214, 216. Likewise, each output port 212, 214, 216 may receive ATM cells from any given input port 202, 204, 206.

Depending on the design of the switching fabric there may be points, referred to here as contention points, where more packets may arrive then may leave in a given time interval. At these points buffers are used to store the data until it can be forwarded. If too much data must be stored then one of these buffers may overflow and the data is lost. For example data packets can be lost in the switching system 200 if too many data packets destined for the same output port 212, 214, 216 are sent into the switch fabric 210 too quickly from the input ports 202, 204, 206. Fixed length internal data packets are forwarded from contention points at a fixed rate. If multiple internal data packets converge on any point in the switch fabric faster than they can be forwarded, then some of them must be queued in the switch fabric 210. The switch fabric's ability to buffer or queue data packets is limited however. If too many internal data packets need to be queued and any of the limited switch fabric buffers become full, additional data packets that cannot be queued are deleted.

To avoid overflowing a given buffer in the switch fabric, the amount of data arriving at the associated contention point must not exceed the amount of data leaving the contention point by an amount greater than the buffer size when measured over all time intervals.

The rate of a data flow is defined as the amount of data sent divided by the time interval in which this data was sent. We use the term "steady rate" for a data flow that produces approximately the same rate when measured over any time interval, both short and long. A "bursty rate" is one where the rate of the data flow may vary significantly depending on whether the time interval is long or short. For a contention point with a specific buffer size, a buffer overflow can be avoided if each input port 202, 204, 206 sends packets to the contention point at a steady rate such that the sum of the packet input rates is equal to or less than the packet output rate from the contention point. This must be true for each of the system's contention points. If an input port 202, 204, 206 is assigned a rate at which it may send data packets to a contention point so as to avoid buffer overflow, it should send data packets at a steady pace that is at or below the given rate. If an input port 202, 204, 206 sends packets to a contention point in a bursty fashion, (i.e. it sends many packets to the point in a short period of time) then the instantaneous data packet rate is significantly greater than the average rate and switch fabric buffers might overflow. It is therefore important that an input port 202, 204, 206 send data packets to each of the contention points at steady rates by evenly spacing out packets sent to each contention point as much as possible. Deciding when any given input port should send a packet to any given contention point, a process known a scheduling, is vital to the performance of a switch.

An improved methodology for scheduling data packets to be sent into the switch fabric in a computationally efficient manner so as to reduce or eliminate the probability of buffer overflow at switch fabric contention points would be an improvement over the prior art.

SUMMARY OF THE INVENTION

In many packet switching systems, data is moved internally from input ports to output ports in fixed length internal data packets. Since all internal packets are the same length, it takes each input port the same amount of time to send any internal packet into the switch fabric. Time, therefore, is broken into "time slots," (or just "slots") with each time slot being the time it takes to send an internal packet from any input port into the switch fabric. In any time slot, each of the input ports may send an internal packet into the switch fabric. If an input port does not send an internal packet in a given time slot (perhaps because it has no internal packets to send or it does not have permission to send an internal packet it has) it must wait until the next time slot time to send an internal packet.

Time slots may be grouped into larger units of time known as "frames." Each frame consists of "T" time slots. Packet switching systems frequently use buffers in the switch fabric or operatively coupled to the switch fabric to temporarily store internal packets as they make their way from the input ports to the output ports through the switch fabric. Because the data buffers holding internal packets in the switch fabric can be overrun if data arrives too fast, scheduling internal data packets into the switch fabric so that internal packets do not overrun a buffer can become critically important. The data buffering requirements of the switch fabric can be affected by how data is scheduled into the switch. By appropriately scheduling data into the switch, buffering requirements can be reduced. Data loss can also be reduced or even eliminated.

There is provided herein, a computationally simple and efficient method for scheduling data out of an input data buffer and into a switch fabric. When used in connection with a packet switching system, switching fabric buffer overruns and the associated data loss are reduced.

Using random access memory for example, an input data structure known as an "assignment list" is created in each input port. The data structure stores pointers, (known as vectors, ensemble identifiers, or ensemble IDs). Each ensemble ID is associated with a group of traffic that passes through the input port. More formally, an "ensemble" consists of all of the packets or cells passing through an input port that share some important, predetermined attributes defined by the switch operator or some other entity. Each ensemble ID is associated with an ensemble. Each ensemble ID in the assignment list represents the permission to send into the switch fabric a single fixed-length internal data packet from the ensemble associated with the ensemble ID. It is the responsibility of a local scheduler to decide which specific internal packet of an ensemble to send into the switch fabric when that ensemble has permission to forward an internal packet.

One of the attributes that defines an ensemble is that all of the internal packets of an ensemble must pass through a specific contention point in the switch fabric. Additional attributes may further define an ensemble. Other attributes include, but are not limited to, quality of service class of the data, final network destination of the data, point of origin of the data, and type of application sending or receiving the data. It is possible for an internal packet to belong to two or more ensembles but every internal packet should belong to at least one ensemble.

In our embodiment we only consider the contention point attribute. Specifically, the contention points of interest are the links from the switch fabric to the output ports. Thus, each ensemble is defined by the output port through which all of the ensemble's traffic will pass. The result is that internal packets are classified and scheduled based on the switch's output ports.

A global scheduler or other controller for the switching system, assigns or designates for each input port the right to send certain numbers of fixed-length internal data packets from the various ensembles during a frame. A local scheduler for each input port creates a list of the ensemble IDs (the assignment list). The ensemble IDs identify the ensembles from which internal packets can be sent into the switch fabric. The length of the assignment list is equal to T, the number of time slots in a frame. The number of ensemble IDs in the assignment list is equal to the number of internal packets the input port has permission to send in the up-coming frame. If the input port has permission to send less than T internal packets in the upcoming frame then some of the assignment list entry locations will not contain ensemble IDs. If the input port has permission to send more than T internal packets in the upcoming frame, then some of the assignment list entry locations may contain more than one ensemble ID.

After the global scheduler indicates how many packets from each ensemble may be sent in the upcoming frame, the local scheduler places the permitted number of ensemble IDs for a given ensemble consecutively in the first open entry locations in the assignment list according to some ordering of the ensembles. For example, consider the case where the destination output port is the only attribute of the ensembles. If an input port has been granted permission to send four internal packets to output A and two internal packets to output B in an upcoming frame, then the input port creates four "output A" ensemble IDs and two "output B" ensemble IDs. The four "output A" ensemble IDs are placed in the first four entry locations in the assignment list, numbered 0 through 3. The two "output B" ensemble IDs are placed in the next two slots, numbered 4 and 5.

The input port's opportunities to transmit internal packets into the switch fabric are enumerated sequentially in binary form using a fixed number of bits starting from zero. To determine which ensemble an input port should send a packet from in a given transmission slot, the bits of the binary number of the transmission slot are reversed such that the least significant bit becomes the most significant bit, the second least significant bit becomes the second most significant bit, and so on. This new number is then used as an index to the assignment list and the ensemble IDs in this entry indicate the ensemble of the internal packet to be sent. The local scheduler then chooses a packet from the ensemble and sends it into the switch fabric during the transmission slot.

BRIEF DESCRIPTION OF THE DRAWINGS

FIG. 1 shows a prior art depiction of an ATM packet header and a portion of a forty-eight byte payload.

DETAILED DESCRIPTION OF THE PREFERRED EMBODIMENT

Figure 2:
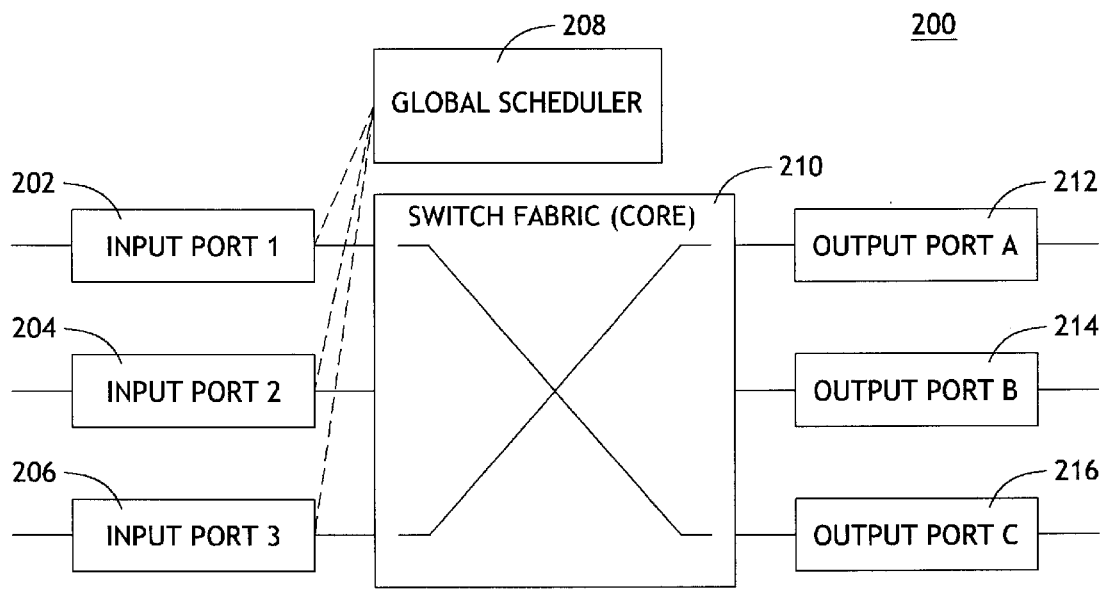
FIG. 2 shows a simplified block diagram of an ATM switch.

FIG. 2 shows a simplified block diagram of a data packet switching system 200. The system is comprised of input ports 202, 204 and 206 into which ATM data packets or some other types of data packets are sent from different sources, not shown. An input port 202, 204, 206 receives data packets, such as the ATM cell shown in FIG. 1, each of which needs to be routed through the switch fabric to one or more particular output ports on their way to a destination through the packet network. As data packets arrive at the ports 202, 204, 206, the packets are queued in the ports according to the particular output port 212, 214, 216 to which each data packet must be sent via the switch fabric 210 (or according to some other set of packet attributes that defines the ensembles). As the data packets arrive at the input ports, the input ports therefore create a number of data queues corresponding the number of different ensembles. By way of example, if the switching system 200 has three different output ports 212, 214, 216 as shown in FIG. 2, the input ports 202, 204, 206 may each have three different data packet queues that store input data packets according to the output port to which the data packet is to be switched via the switch fabric 210. Per-flow and other queuing is also possible. In per-flow queuing, data packets belonging to different flows are queued separately. For instance, two flows may come into the same input port of a switch and leave from the same output port. They may have different delay requirements, however. Per-flow queuing allows the switch to give each flow the service it needs, even though data from each flow may travel the same path through the switching fabric. The per-flow queues are conceptually grouped together according to their ensemble. First, the local scheduler decides from which ensemble to send an internal packet. It then selects a flow that belongs to that ensemble. Finally, it takes a packet of the selected flow and sends it into the switch fabric.

After the internal packets are categorized or sorted according to their ensembles, the internal packets are sent from the input port queue or buffer into the switching fabric. In each "slot" of a frame of slots, each input port can send a single internal packet (or zero internal packets) into the switch fabric according to instructions from the local scheduler. Accordingly, for each time slot of a frame, the input port hardware and/or software must decide whether to send to the switch fabric, an internal packet from the "A" queue, the "B" queue, or the "C" queue, or perhaps no internal packet at all. In other words, an input port must first decide—or be instructed—the ensemble from which it will send one or more internal packets. The input port must then functionally take an internal packet from the appropriate queue and input that internal packet to the switching fabric.

Because of the way data packets are routed through an ATM, IP, or other type of data network, any of the input ports may receive data packets that need to pass through to any one or more of the output ports. Stated alternatively, any one or more output ports might receive data packets from any one or more of the input ports.

Data is sent though the switch fabric 210 in fixed length internal packets. In the case of ATM cells, information from the cell header is used to route the cells to the appropriate output port. Alternatively, the cells could be encapsulated using a proprietary fixed length internal packet format. The ATM cell would be the payload of this internal packet and any information the switch fabric needs to route the internal packet to the correct output port is placed in the encapsulating packet's header. In the case of IP packets (which are variable length), a packet could be broken up or segmented into multiple pieces (if the IP packet is too long to be encapsulated into a single internal packet), and encapsulated into one or more internal packets. The internal packets can then be sent through the switch fabric 210 and the IP packet is reassembled in the output port 212, 214, 216.

When data packets arrive at an input port 202, 204, 206 they are processed (prioritized, routed, (including possible segmentation and/or encapsulation)) into fixed length internal packets and buffered until they are sent into the switch fabric. Internal data packets are queued in the input ports such that the internal packets belonging to different ensembles can be distinguished from each other. Queuing bases include but are not limited to per-output port queuing and per-flow queuing. Per flow queuing is possible because all of the cells or packets in a flow pass through the same contention points. (Since multiple flows passing through an input port may belong to the same ensemble, it is necessary to have a method of choosing which flow gets to send an internal packet once the destination ensemble has been selected.)

Deciding which queued internal packet to send into the switch fabric next, if any, is a process known as scheduling. Scheduling is important because it determines how well the switch fabric is utilized, among other things. Scheduling can be split into two parts. The first part, which we call global scheduling, involves determining how many internal packets each input port may send from each ensemble during an upcoming frame. Global scheduling is beyond the scope of this disclosure and not required for an understanding of the invention disclosed and claimed herein. Local scheduling consists of determining which, if any, ensemble an internal packet should be sent from in a specific time slot and which specific internal packet should be sent from the ensemble selected. These local scheduling decisions are done without regard to the local scheduling decisions made by or for other input ports so the global scheduling allocations constitute the only switch-wide coordination between the input ports. This patent covers the local scheduler process of determining which ensemble, if any, an internal packet should be sent from in a given time slot. Selecting the specific internal packet to send once the ensemble has been determined is beyond the scope of this disclosure and not required for an understanding of the invention disclosed and claimed herein.

If internal packets from a certain ensemble are sent into the switch fabric too slowly the switch fabric will not be using its resources fully. Worse yet, if internal packets from a certain ensemble are sent into the switch fabric too quickly then buffers in the switch fabric may overflow. If a data packet arrives at a full buffer it is simply deleted and ceases to exist (it is "dropped"). This is undesirable since the destination will not receive this packet.

If internal data packets are being sent toward a contention point faster than they can exit, the packets must be buffered. Inasmuch as there is only a limited amount of buffering in the switch fabric, however, too many internal packets heading towards a contention point might cause a switch fabric buffer to overflow.

To avoid dropping packets it is necessary to avoid having packets heading towards a contention point faster than packets can leave the contention point for more than a short period of time. Packets enter the switch fabric destined for a contention point at an instantaneous rate equal to the sum of the instantaneous rates that the input ports are sending packets destined for that contention point into the switch fabric.

Assuring that the instantaneous rate that packets destined for a given contention point enter the switch fabric is less than or equal to the rate that packets leave the contention point depends on two factors. First, each input port must be assigned a rate at which it may send packets to the contention point such that the sum of the rates of all of the input ports to that contention point is less than or equal to the rate that packets may leave the contention point. Second, an input port must not send packets at an instantaneous rate faster than its assigned rate for a significant period of time.

To fulfill the first criterion, some sort of global scheduling mechanism is used to roughly coordinate the transfer of data packets into the switch fabric 210 on a switch-wide basis. This global scheduling mechanism calculates how many packets each input port can send from each ensemble during an upcoming period of "T" time slots known as a frame. This mechanism may exist as a centralized component of the switch, as a process distributed throughout the switch, at a location separate from the switch, or even as some other alternative.

This mechanism could implement many different algorithms. At one extreme these per-frame grants may be static, not changing from frame to frame based on, for example, long term average rates needed by a flow or a set of flows. They would be changed infrequently (i.e. on a time-scale much greater than a frame length). At another extreme this mechanism could rely on feedback from the input ports and the switch fabric, for example, and could calculate the grants on a frame-by-frame basis. Numerous other approaches, such as a combination of fixed rates and varying grants, or using feedback to dynamically change grants over periods larger than a single frame are also possible.

While this global scheduling mechanism determines how many internal packets each input port may send from each ensemble over the course of a frame, the input ports must choose when specifically to send an internal packet from each ensemble. The local schedulers 308 in all of the input ports independently decide in what order to actually transmit internal data packets they have been given permission to send. For instance, if a frame is eight time slots long, the global scheduler could give one of the input ports permission to send four internal packets to output port A and two packet to output port B. The local scheduler for the input port must now decide when to send internal packets to A, when to send internal packets to B, and when to send nothing. It may decide to send internal packets as follows: packet to A, packet to A, packet to A, packet to A, packet to B, packet to B, no packet, no packet. On the other hand it may send packets in the following order: A, B, A, no packet, A, B, A, no packet.

The second criterion above emphasizes that it is desirable for an input port 202, 204, 206 to spread out the packets from each ensemble evenly over the frame. Thus, the second pattern in the example in the paragraph above (A, B, A, no packet, A, B, A, no packet) is preferable to the first (A, A, A, A, B, B, no packet, no packet). Internal packet spacing does not have to be perfect. Any reasonable spacing is a large improvement over a more bursty spacing. The inventive concept in this disclosure is a simple but effective way of mixing the sequence of internal packets input to the switch fabric 210 so that the buffers in the switch fabric are not overwhelmed.

In the preferred embodiment, an input port's local scheduler 308 receives a set of numbers that corresponds to the number of internal packets that that input port may send from each ensemble during a specific frame. Local schedulers 308 for other input ports also receive permission to send specific numbers of internal packets during the frame.

The local scheduler creates a data structure known as the assignment list. The list is typically embodied as an addressable storage media such as semiconductor random access memory. The data structure list consists of entry locations, into which specific codes may be written, sequentially numbered with k-bit binary ordinal numbers, where $k=\log_2(T)$, starting with zero and ending with T−1. Initially, each entry contains a specific vector indicating that nothing has been written into the location. Pointers, known as a ensemble identifiers or ensemble IDs, each representing one of the ensembles, are placed into the entries of the data structure list. Each entry may hold one or more ensemble IDs. Ensemble IDs for specific ensembles are placed in the assignment list according to some pre-determined sequence of ensembles. This sequence may be fixed or it may vary from frame to frame. Beginning with entry zero, the local scheduler sequentially places ensemble IDs for ensembles in the assignment list. The number of ensemble IDs representing an ensemble that is placed in the assignment list is equal to the number of internal packets that an input port has permission to send from that ensemble in the upcoming frame. All of the ensemble IDs for a given ensemble are grouped sequentially. After placing all the ensemble IDs representing permissions for a particular ensemble in the assignment list, the ensemble IDs from the next ensemble in the ensemble sequence are placed in the list beginning with the next unwritten entry in the list. Assignment list entry locations that do not have ensemble IDs written into them retain their initial value.

Once the assignment list has been constructed the order in which internal packets are sent from each of the ensembles during the upcoming frame can be readily determined. Each time slot in a frame is numbered sequentially from 0 to T−1 using k-bit binary numbers. The local scheduler 308 determines from which ensemble it should send a queued internal data packet in a given transmission slot by reversing the order of the bits in the k-bit binary number of the frame slot making the most significant bit the least significant, the second most significant bit the second least significant, and so on. This k-bit reversed bit number it then used as an index into the assignment list. If the number of permissions given to an input by the global scheduler is T or less, each entry will contain zero or one ensemble ID. Thus, the ensemble ID in the assignment list entry location indexed by the reversed bit number determines the ensemble from which an internal packet should be sent. If the list entry location does not contain a ensemble ID (it still contains its initialized value) the input port should not send an internal packet in that transmission slot.

Figure 3:
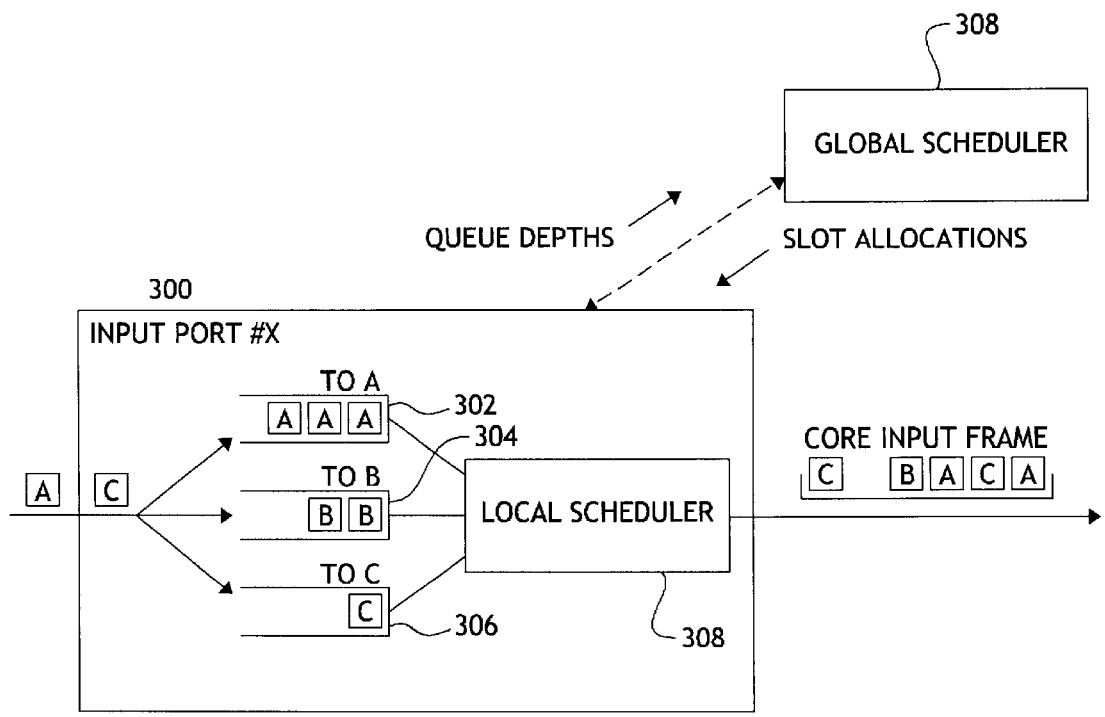
FIG. 3 shows a simplified block diagram of how an ATM input port of the switch shown in FIG. 2 schedules ATM data received at the port.

FIG. 3 shows a simplified representation of an input port 300 and how data packets of the input port can be drawn off of three different data packet queues 302, 304 and 306 (the output port being the only attribute of each ensemble in this example) according to a local scheduler 308 and input to the switch fabric 210 (in FIG. 2). As shown in FIG. 3, input data packets come into the port 300 in possibly any order. As shown, a "C" packet arrived in the port 300 ahead of an "A" packet. The designation of "A" "B" or "C" identifies the output port to which the particular packet is supposed to be routed by the switch (which corresponds to which ensemble each packet belongs to in this example).

Conceptually, the "A" packets that are in the port are grouped together to form a queue of "A" packets. Similarly, the "B" and "C" packets are also grouped together. The number of internal packets that are read from any of the queues in a frame is determined by the global scheduler 310, but when that determination is made, the local scheduler reads A, B and C packets from the respective queues and sends them into the switch fabric 210. As shown, the output data packet sequence is "ACAB_C" (note that for one slot no internal packet is sent). As set forth above, if too many internal packets for any given output (A, B or C) are sent in to the switch fabric too rapidly, a buffer in the switch fabric could be overrun, causing data to be lost. By properly ordering the sequence according to which queued internal data packets are sent to the switch fabric, buffer overruns can be reduced. The internal packet ordering is better understood by reference to FIG. 4.

Figure 4:
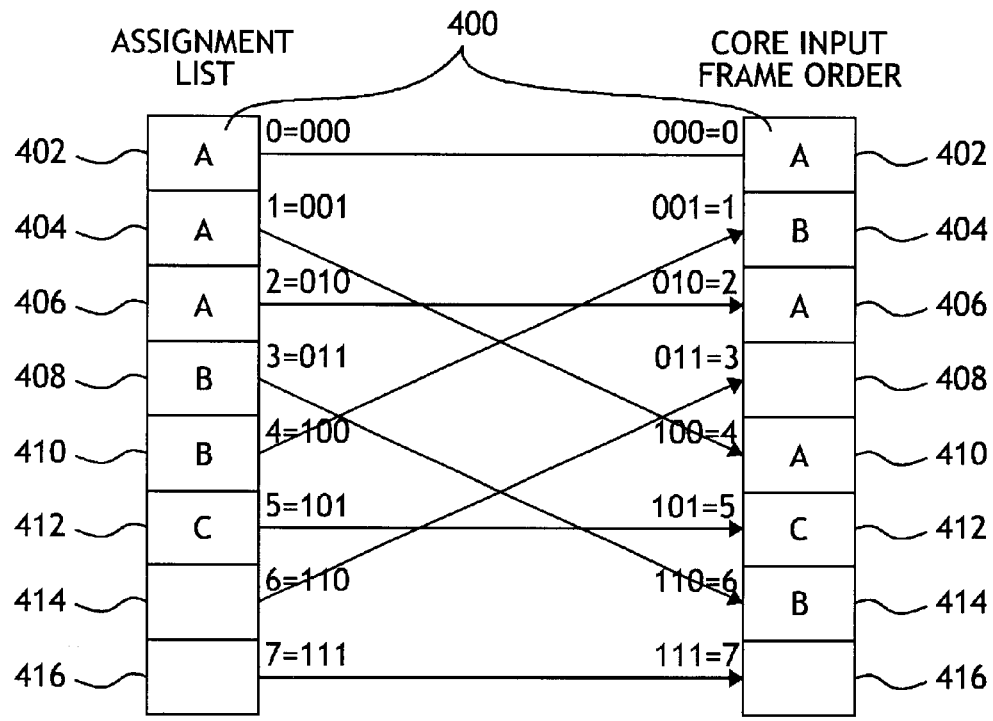
FIG. 4 shows a simplified depiction of an assignment list.
Figure 4:
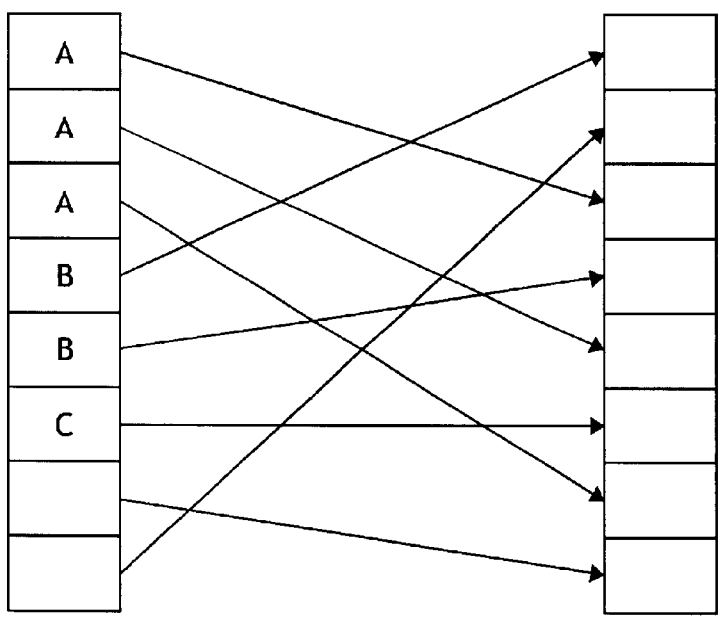

FIG. 4 shows a simplified example of an assignment list 400. Ensemble IDs identifying ensembles "A" "B" and "C" are shown being written into addressable storage locations

402, 404, 406, 408, 410 and 412 of a multi-byte random access memory device representing the assignment list. Each of these locations is assigned a 3-bit binary-valued address starting at zero through 7 decimal, 111 in binary.

As shown in FIG. 4, there are three "A"-type vectors stored in locations 0, 1 & 2; two "B" vectors stored in locations 3 & 4 and one "C" vector stored in location 5. These vectors identify or point to the data queues from which queued data packets are to be read and transferred into the switch fabric 210 in an upcoming frame. As shown in FIG. 4, three data packets from the queue of ensemble "A" packets, i.e. the queue of data packets required to be switched through to the "A" output port, should be transferred to the switch fabric 210 in the upcoming frame. Likewise, two ensemble "B" packets from the "B" packet queue should be read into the switch fabric. Finally, one ensemble "C" packet is to be read from the "C" packet queue into the switch fabric by which the "C" packet is routed to the "C" output port.

The inventive concept herein is how the sequence of internal packets sent into a switch fabric is pseudo-smoothed by reversing the bits of a k-bit binary frame slot number to generate a reverse binary number of frame slot numbers according to which internal packets are sent into the switch fabric. In FIG. 4, the order that internal packets from the various queues, A, B or C, are sent to the various output ports is determined by reversing the bits of the 3-bit binary frame slot numbers and using the bit-reversed frame slot numbers as indexes into the assignment list into which the A, B, and C vectors were written. For instance, with respect to FIG. 4, frame slot 000 (binary) (000 binary=0 decimal) corresponds to assignment list entry 000 (binary) which holds a ensemble ID representing ensemble A (which encompasses the traffic passing through output A in this example). Thus, in frame slot 0 (decimal) an internal packet should be sent to output A. Frame slot 001 (binary) (001 binary=1 decimal) corresponds to assignment list entry 100 (binary) (100 binary=4 decimal) which holds a ensemble ID for ensemble B. Frame slot 011 (binary) (011 binary=3 decimal) corresponds to assignment list entry 110 (binary) (110 binary-6 decimal) which does not contain a ensemble ID. Thus, the input port does not send an internal packet into the switch fabric in time slot 3. Overall, as shown in FIG. 4, one "A" packet is read from the "A" packet queue, followed by a "B" packet from the "B" queue, which is then followed by another "A" packet, then no packet, another "A" packet, a "C" packet and finally a "B" packet. From the list of entries on the right hand side of FIG. 4 it can be seen that the ensembles of internal packets (A, B or C) are nicely spaced by virtue of how data packets from the various input packet queues were selected to be input to the switch fabric 210.

By way of the foregoing method, data packet switching system switch fabric buffer overruns can be expediently reduced or eliminated. The computation of a reverse binary number is simple and can be quickly performed. By selecting ensembles according to the reverse binary value of the frame time slot number used as an index into an assignment list of ensemble IDs sequentially ordered according to the ensembles they are associated with, queued internal packets are transferred into the switch fabric 210 in a smooth fashion. Switch fabric overruns are significantly reduced or eliminated by spacing out the internal packets that will pass through various contention points.

Figure 5:
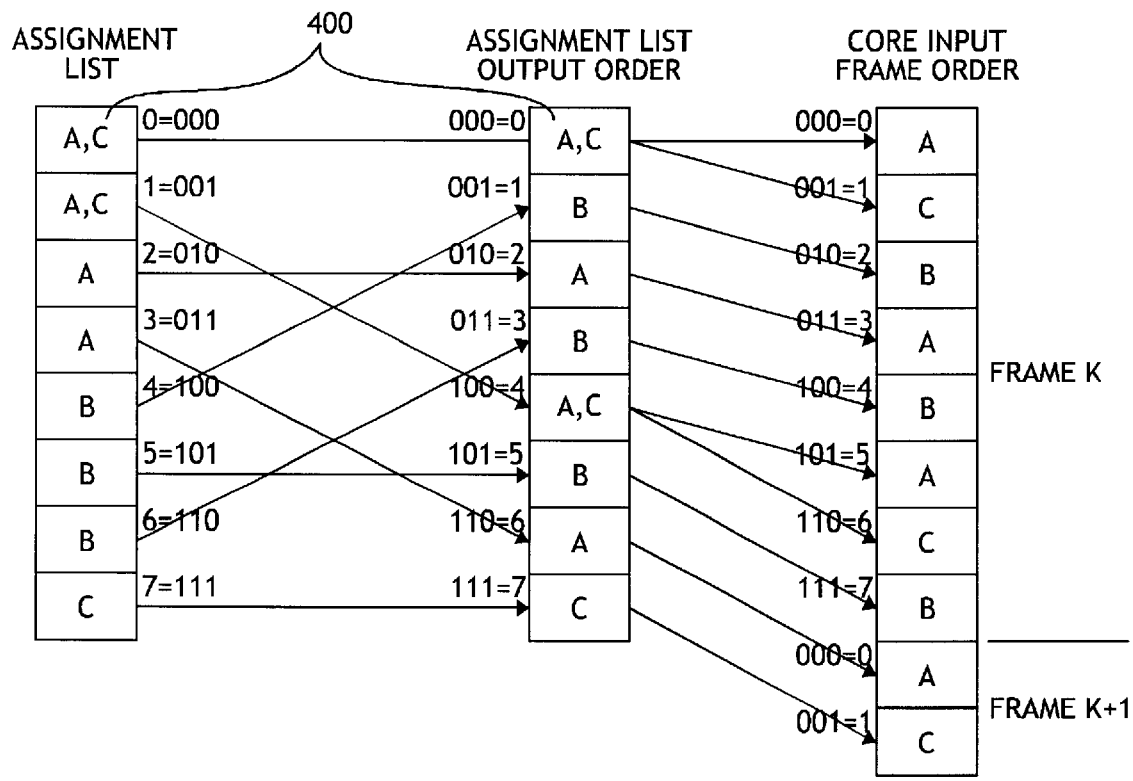
FIG. 5 shows how assignment list entries with multiple ensemble IDs are mapped to consecutive transmission slots.

An additional mechanism is added to the above description to handle the case when the global scheduler gives permission to an input to send more than T internal packets in an upcoming frame. Since the input can physically only send T packets in a frame, some of these permissions cannot be used in the upcoming frame. It may be desirable to retain the "extra" packet permissions for future frames in order to meet the bandwidth needs of an ensemble. However, it is important that the method of sending these extra packets into the switch fabric does not overload a buffer at a contention point. Herein is described a method of retaining the extra permissions for future frames while sending packets to a contention point at a pseudo-smoothed rate. As described previously, the entries of the assignment list must be capable of containing more than one ensemble ID. Thus, an assignment list entry may hold a series of ensemble IDs representing ensembles which are chosen when the entry of the assignment list is selected. This ensemble ID series may be implemented as a queue of ensemble IDs for each list entry. FIG. 5 illustrates an assignment list where T=8 and multiple ensemble IDs may reside in each assignment list entry.

When the number of permissions given by the global scheduler for an upcoming frame is greater than T, the assignment list is filled according to the following method. The ensemble IDs for specific ensembles are placed in the assignment list according to some predetermined sequence of ensembles. Beginning with entry number 0, the scheduler places ensemble IDs sequentially in the assignment list for a particular ensemble, where the number of ensemble IDs placed in the list represents the number of permissions for that ensemble given by the global scheduler. A permitted ensemble ID is assigned to the next empty entry in the list until all permitted ensemble IDs have been placed in the list or until entry numbered T−1 is reached. If there are more ensemble IDs to place in the assignment list, as in the case when greater than T total permissions have been given to an input port for an upcoming frame, the T+1 ensemble ID is appended to the assignment list entry queue at entry number 0. Any remaining grants are appended sequentially in the entry list queue at the next entry in the list that has only one grant. This process continues until all grants have been entered or until the end of the list is reached again. If additional grants remain, continue appending them to the list entry queues starting with entry number 0 in the same consecutive manner. This process repeats until all granted ensemble IDs are placed on the list.

For example, in an assignment list where T=8 and the only ensemble attribute is the output port the data must pass through, suppose the global scheduler grants permission to send 4 internal packets to output port A, three internal packets to output port B and three internal packets to output port C. The assignment list is filled according to FIG. 5. Note that list entries 0 and 1 contain a queue of two ensemble IDs: both entries contain the ensemble IDs, A and C.

The ensemble IDs from the assignment list are chosen according to the reverse binary indexing method described previously. Each entry is sequentially numbered with a k-bit binary ordinal number starting with 0 and ending with T−1. The local scheduler 308 determines from which ensemble (to which output port) it should send a queued internal data packet by reversing the order of the bits in the binary frame slot number. This bit-reversed number is then used as an index into the assignment list. Since the entry may contain more than one ensemble ID, packets from all the ensemble IDs of the entry cannot be sent into the switch fabric during one transmission slot. To transmit packets from the chosen ensembles into the switch fabric, one per transmission slot, the ensemble IDs from the chosen entry are assigned consecutively to the next empty transmission slots in the frame.

Figure 6:
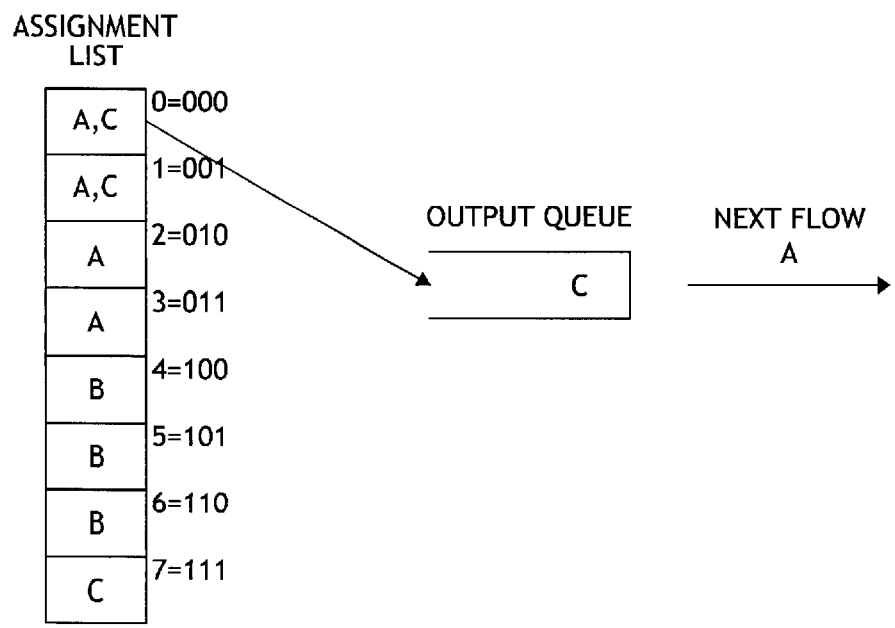
FIG. 6 shows how an output queue can be used to implement the mapping of multiple ensemble IDs from an assignment list entry into consecutive transmission slots.

The ensemble IDs can be assigned to the next empty transmission slots by a variety of methods, one such method is to send valid ensemble IDs from entries in the assignment list to an output queue as shown in FIG. 6. (If an entry contains the initialized value and does not contain an ensemble ID, no vector is placed in the output queue.) After the ensemble IDs from the chosen entry are placed in the output queue, one ensemble ID is taken from the output queue. This chosen ensemble ID represents the ensemble from which an internal data packet is chosen to be sent into the switch fabric during the transmission slot. If no ensemble IDs exist in the output queue, no packet is sent to the switch fabric in the transmission slot. FIG. 6 illustrates the operation for frame slot 0 when the output queue is empty just prior to frame slot 0. At frame slot 0, the 3-bit reversed binary number 0 is created. This bit-reversed number is used to select entry 0 from the assignment list. The two ensemble IDs, A and C, residing in entry 0 are sent to the output queue. Ensemble ID A is chosen from the output queue, and an internal data packet from ensemble A is sent into the switch fabric in frame slot 0. If no ensemble IDs exist in the output queue, then no internal data packet is sent during the transmission slot. FIG. 5 shows an example switch fabric input frame order produced by the given assignment list. The 10 internal packets from the ensembles identified by the ensemble IDs in the assignment list are sent into the switch fabric during frames K and K+1. Internal packets selected for the next frame begin transmission in time slot 2 of frame K+1.

As explained, the embodiment described creates an assignment list of ensemble IDs as follows, for example, for the case of a frame length of 8 time slots with the local scheduler having permission to send 3 fixed length internal packets from ensemble 1, 1 from ensemble 2, 2 from ensemble 3, and 0 from ensemble 4:

Entry 0: ensemble 1 ID
Entry 1: ensemble 1 ID
Entry 2: ensemble 1 ID
Entry 3: ensemble 2 ID
Entry 4: ensemble 3 ID
Entry 5: ensemble 3 ID
Entry 6: empty
Entry 7: empty To determine the ensemble from which the local scheduler should send an internal packet in a particular time slot, for example, time slot X, the number Y on the assignment list is determined by reversing the bits of X. For slot 6, X=6=110 (binary). Thus, reversing the bits yields Y=011 (binary), which is 3. Entry 3 indicates ensemble 2, so the local scheduler should send an internal packet from ensemble 2 in slot 6.

In an alternative embodiment, the entries for each ensemble are the entries in the list above that point to the ensemble. Thus, the assignment list would appear as follows:

Ensemble 1: entries 0, 1 and 2
Ensemble 2: entry 3
Ensemble 3: entries 4 and 5
Ensemble 4: no entries To determine from which ensemble to send a packet in slot X, Y is determined as before, and then the ensemble corresponding to the entry is determined. For example, for slot 6, X=6 and Y=3, as before. Since ensemble 2 corresponds to entry 3, the local scheduler should send an internal packet from ensemble 2 in slot 6.

Figure 7:
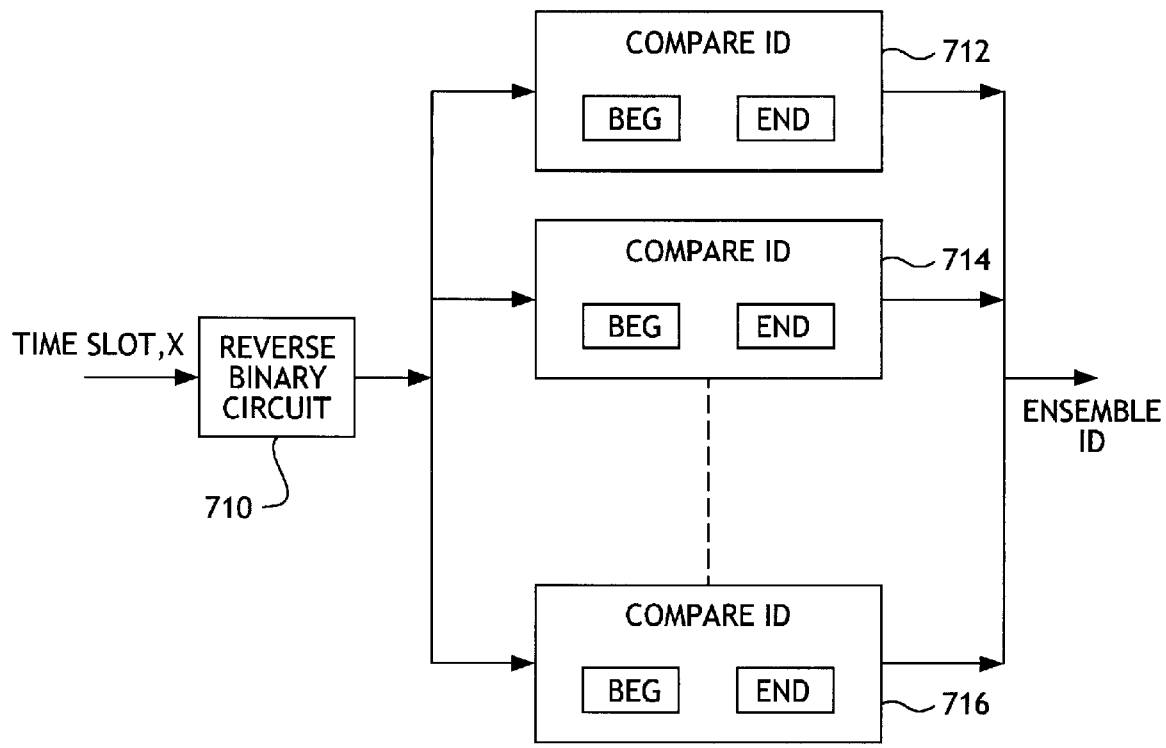
FIG. 7 shows a highly parallel implementation of a reverse binary slot assignment.
Figure 8:
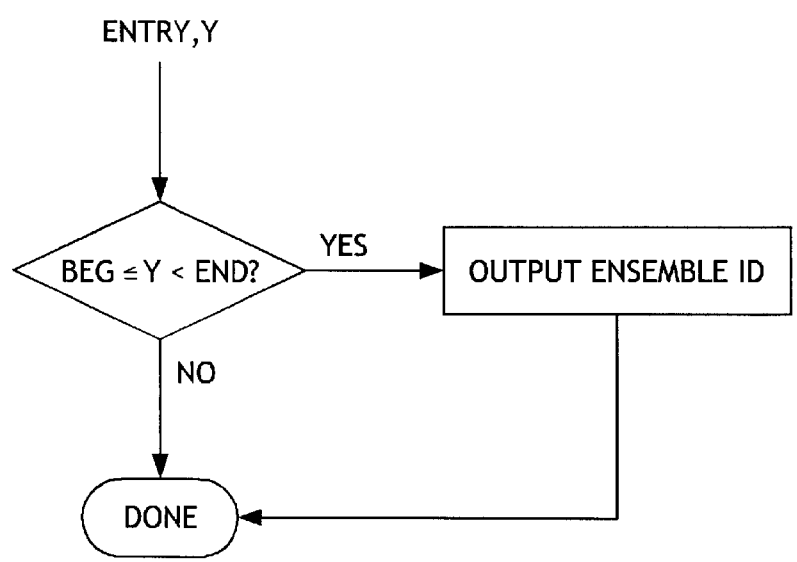
FIG. 8 shows a process employed by the implementation shown in FIG. 7.

Such a system is a highly parallel embodiment and can be implemented as shown in FIGS. 7 and 8. Before the next frame starts, a "Compare ID" block for each ensemble is initialized with a beginning and an end location that its ensemble would have occupied in an assignment list. The beginning location (beg) represents the first element containing the ensemble ID. The end variable (end) indicates where the next ensemble begins.

Packet slot numbers are fed to the circuit in FIG. 7, and a reverse binary operation 710 is performed. Compare ID blocks 712, 714, 716 perform in parallel the process in FIG. 8. The output of the circuit is the ensemble IDs of the selected flow. For example, for the first flow, beg=0. The beg value for the next flow is end value for the previous flow, and the end value is always set to end=beg+r, where r corresponds to the number of slots allocated in a frame for the ensemble.

It will be appreciated that the present invention may be implemented using other embodiments. Those skilled in the art recognize that the preferred embodiments may be altered and modified without departing from the true spirit and scope of the invention as defined in the appended claims.

We claim:

1. In a switching system having a plurality of input ports and a plurality of contention points in a switch fabric, a method of ordering input data packets into a switching system fabric comprised of the steps of:

a. receiving at an input port a number of input data packets, each requiring transfer through at least one of said switch fabric contention points;

b. queuing each input data packet into one or more data queues where each data queue contains packets destined for a particular switch fabric contention point through which each said data packet is to be transferred by said switch fabric;

c. forming a T-member list of vectors, where each vector is chosen from a set of vector values, each vector value save one corresponding to one of the said one or more data queues; the remaining vector value is a null-vector indicating that no-packet is sent into the switch fabric during the corresponding slot;

d. assigning to each of said T members of said list, a k-bit binary ordinal number between 0 and T−1, where $k=\log_2(T)$;

e. for each member of said list, assigning thereto a k-bit reverse binary number valued between zero and T−1 corresponding to the vectors in the list;

f. beginning with the vector assigned the reverse binary value zero and ending with the vector assigned reverse binary number T−1, transferring a data packet into said switch fabric from the data queue corresponding to said vector.

2. The method of claim 1 wherein said step of queuing data packets includes the step of first segmenting data packets into fixed length internal packets.

3. The method of claim 1 wherein said step of queuing data packets includes the step of storing data packets in random access memory.

4. The method of claim 1 wherein said step of forming a T-member list of vectors comprises the formation of a data structure, where each vector is chosen from a set of different-valued vectors, each vector save one corresponding to one of the said data queues; the remaining vector is a null-vector indicating that no packet is sent into the switch fabric during the corresponding slot.

5. The method of claim 1 wherein said step of assigning reverse binary numbers is comprised of reversing the binary digits of said k-bit binary-valued ordinal numbers assigned to said members of said list.

6. The method of claim 1 wherein the contention points are the links from the switch fabric to the output ports.

7. The method of claim 1 wherein all vectors in the T-member list are grouped so that vectors pointing to the same contention point are assigned consecutive binary ordinal numbers.

8. The method of claim 1 wherein the step of transferring the data packets into the switch fabric comprises the steps of:
   i. forming a plurality of parallel processing blocks, wherein each of said blocks corresponds to a said vector and contains the ordinal numbers occupied by the vector in the said assignment list;
   ii. determining a reverse binary number corresponding to a time slot, said time slot one of a plurality of time slots numbered consecutively from 0 to T−1;
   iii. sending said reverse binary number to each of said processing blocks;
   iv. determining, for each processing block, if said reverse binary number corresponds to said ordinal number assigned to said vector of said processing block from said assignment list;
   v. transferring a data packet into said switch fabric from said data queue corresponding to the said vector indicated by said processing block.

9. A switching system having a plurality of input ports, each of which receives data packets, and one or more contention points through which data packets are transferred via a switching fabric, comprised of:
   a. an input port at which data packets from a plurality of sources are received, each data packet requiring transfer through at least one of said one or more contention points via said switching fabric;
   b. a data buffer comprised of at least T storage locations into which data packets from said plurality of sources are stored and queued into at least one or more data queues where each queue contains packets destined for a particular switch fabric contention point through which each of said data packets are to be transferred;
   c. a memory device storing an assignment list of T elements, each element in the list consisting of a vector pointing to one of said one or more data queues, each element of said list being enumerated by an ordinal k-bit binary number, where k=log$_2$(T), ranging in value from zero to T−1 and further being enumerated by a k-bit reverse binary number ranging in value from zero to T−1, said reverse binary number being determined by reversing the binary digits of said ordinal k-bit binary number;
   d. beginning with the element assigned the reverse binary value zero and ending with the element assigned reverse binary number T−1, reading the vector in the element location and transferring a data packet into said switch fabric from the data queue corresponding to said vector.

10. The switching system of claim 9 wherein said memory device is comprised of random access memory.

11. The switching system of claim 9 wherein said data buffer first segments data packets into fixed length internal packets.

12. The switching system of claim 9 wherein said data buffer is a storage device comprised of random access memory.

13. The switching system of claim 9 wherein the contention points are the links from the switch fabric to the output ports.

14. The switching system of claim 9 wherein all vectors in the T-member list are grouped so that vectors pointing to the same contention point reside as elements assigned consecutive binary ordinal numbers.

15. The switching system of claim 9 wherein said data packets are asynchronous transfer mode data packets.

16. The switching system of claim 9 wherein the step of transferring the data packet into the switch fabric comprises the steps of:
   i. forming a plurality of parallel processing blocks, wherein each of said blocks corresponds to a said vector and contains the ordinal numbers occupied by the vector in the said assignment list;
   ii. determining a reverse binary number corresponding to a time slot;
   iii. sending said reverse binary number to each of said processing blocks;
   iv. determining, for each processing block, if said reverse binary number corresponds to said ordinal number assigned to said vector of said processing block from said assignment list;
   v. transferring a data packet into said switch fabric from said data queue corresponding to the said vector indicated by said processing block.

17. A switching system having input ports and a plurality of one or more contention points in the switch fabric, a method of ordering input data packets into a switching system fabric comprised of the steps of:
   a. receiving at an input port a number of input data packets, each requiring transfer through said switch fabric contention points;
   b. queuing each input data packet into one of at least one or more data queues where each data queue contains packets destined for a particular switch fabric contention point through which each said data packet is to be transferred by said switch fabric;
   c. forming a T-member list of elements, where each element in the list consists of a queue of vectors chosen from a set of different vector values, each vector value save one corresponding to each of said data queues; the remaining vector value is a null-vector indicating that no internal packet is sent into the switch fabric during the corresponding slot;
   d. assigning to each of said T elements of said list, a k-bit binary ordinal number between 0 and T−1, where k=log$_2$(T);
   e. for each element of said list, assigning thereto a k-bit reverse binary number valued between zero and T−1 corresponding to the vectors in the list;
   f. beginning with the element assigned the reverse binary value zero and ending with the element assigned reverse binary number T−1, transferring the vectors queued in the list element to an output vector queue for the switch fabric input link;
   g. choosing one vector for the output vector queue and transferring a data packet into said switch fabric from the data queue corresponding to said vector.

18. The method of claim 17 wherein said step of queuing data packets includes the step of first segmenting data packets into fixed length internal packets.

19. The method of claim 17 wherein said step of queuing data packets includes the step of storing data packets in random access memory.

20. The method of claim 17 wherein said step of forming a T-member list of elements comprises the formation of a data structure, where each element in the list consists of a queue of vectors chosen from a set of different-valued vectors, each vector save one corresponding to one of the said data queues; the remaining vector is a null-vector indicating that no packet is sent into the switch fabric during the corresponding slot.

21. The method of claim 17 wherein said step of queuing vectors in an output vector queue includes the step of storing vectors in random access memory.

22. The method of claim 17 wherein the contention points are the links between the switch fabric and the output ports.

23. The method of claim 17 wherein all vectors in the T-member list are grouped so that vectors pointing to the same contention point reside in elements assigned consecutive binary ordinal numbers.

24. The switching system of claim 17 wherein said data packets are asynchronous transfer mode data packets.

25. The switching system of claim 17 wherein the step of transferring the data packet into the switch fabric comprises the steps of:

i. forming a plurality of parallel processing blocks, wherein each of said blocks corresponds to a said vector and contains the ordinal numbers occupied by the vector in the said assignment list;

ii. determining a reverse binary number corresponding to a time slot;

iii. sending said reverse binary number to each of said processing blocks;

iv. determining, for each processing block, if said reverse binary number corresponds to said ordinal number assigned to said vector of said processing block from said assignment list;

v. queing said vectors from said processing blocks into said output vector queue.

* * * * *